(12) United States Patent
Nishimura et al.

(10) Patent No.: US 8,637,199 B2
(45) Date of Patent: Jan. 28, 2014

(54) FUEL CELL USING ORGANIC FUEL

(75) Inventors: Katsunori Nishimura, Hitachiota (JP); Masayoshi Kanno, Kitaibaraki (JP); Shinsuke Andoh, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 300 days.

(21) Appl. No.: 12/805,843

(22) Filed: Aug. 20, 2010

(65) Prior Publication Data

US 2011/0053024 A1 Mar. 3, 2011

(30) Foreign Application Priority Data

Aug. 31, 2009 (JP) ................................. 2009-199195

(51) Int. Cl.
*H01M 8/10* (2006.01)

(52) U.S. Cl.
USPC .......................................... 429/432; 429/443

(58) Field of Classification Search
USPC ......................................... 429/431, 432, 443
See application file for complete search history.

(56) References Cited

U.S. PATENT DOCUMENTS

| | | | |
|---|---|---|---|
| 6,589,679 B1 | 7/2003 | Acker et al. | |
| 6,824,899 B2 | 11/2004 | Acker et al. | |
| 2004/0265655 A1* | 12/2004 | Kozu et al. | 429/13 |
| 2009/0110965 A1* | 4/2009 | Chen et al. | 429/13 |

FOREIGN PATENT DOCUMENTS

| | | |
|---|---|---|
| JP | 2004-527067 | 9/2004 |
| JP | 2004-327354 | 11/2004 |
| JP | 2004-537150 | 12/2004 |
| JP | 2005-332597 | 12/2005 |
| JP | 2006-073486 | 3/2006 |
| JP | 2007-095679 | 4/2007 |
| JP | 2007-294334 | 11/2007 |
| WO | WO 02/49125 A2 | 6/2002 |
| WO | WO 03/012904 A2 | 2/2003 |

* cited by examiner

*Primary Examiner* — Ula C Ruddock
*Assistant Examiner* — Frank Chernow
(74) *Attorney, Agent, or Firm* — Antonelli, Terry, Stout & Kraus, LLP.

(57) ABSTRACT

A fuel cell is provided which can control an optimum fuel concentration according to an output without a sensor for measuring the fuel concentration. The fuel cell uses a liquid organic compound for fuel and includes a membrane-electrode assembly, a passage for allowing fuel or oxidant to flow, a fuel supply unit for supplying the fuel to the fuel cell and intermittently or periodically changing a rate of fuel supply, and a computation processor for measuring a signal of a voltage or an output of the fuel cell, computing the rate of the fuel supply and the signal, and correcting the rate of the fuel supply. In the fuel cell, the optimum fuel concentration can be easily controlled according to the output by periodically varying the fuel concentration from a reference fuel concentration, measuring a voltage or an output and a variation range of the voltage or the output, and then determining whether the reference fuel concentration is appropriate or not.

8 Claims, 5 Drawing Sheets

FUEL CELL USING ORGANIC FUEL

CLAIM OF PRIORITY

The present application claims priority from Japanese Patent Application JP 2009-199195 filed on Aug. 31, 2009, the content of which is hereby incorporated by reference into this application.

FIELD OF THE INVENTION

The present invention relates to polymer electrolyte fuel cells using a liquid organic compound for fuel.

BACKGROUND OF THE INVENTION

Polymer electrolyte fuel cells using a liquid organic compound, such as methanol, ethanol, or dimethyl ether, for fuel are characterized by low noise, low operating temperature (about 70 to 80° C.), and ease of fuel supply. Therefore, the polymer electrolyte fuel cells are expected to be applied widely to a portable electric power generator, a power source for electric automobiles, and a power source for light vehicles, such as an electric motorcycle, an electric bicycle, a wheelchair, or mobility scooter.

For these applications, a direct methanol fuel cell (hereinafter referred to as a DMFC) using methanol for fuel has advantages that a fuel processor can be omitted, that fuel can be supplied at room temperature, that fuel cost to the output is cheap as compared to gasoline, and that electricity can be generated at a low temperature of 50 to 60° C. to reduce a startup time. In particular, an "active" type DMFC in which the fuel is forced to circulate by a pump can provide a high output power of several tens of watts (W) to several hundreds of watts (W). Thus, the active DMFC is suitable for supplying power to a relatively low power device, such as an electronic device or a lighting apparatus. By increasing the cell size or the number of stacked cells, the DMFC of 1 kW or more can be provided and applied to mobile objects.

The DMFC is controlled such that the concentration of methanol is in a predetermined range. The DMFC is provided with a sensor for measuring the concentration. The reason why the concentration of methanol needs to be controlled is that the amount of methanol penetrating an electrolyte membrane is increased as the methanol concentration becomes high, which results in a decrease in cell voltage or output. Another method for controlling the methanol concentration is proposed which estimates the methanol concentration from a state of a fuel cell without using any sensor.

Other methods in related arts for controlling the methanol concentration are disclosed, for example, in Japanese Unexamined Patent Application Publication No. 2007-95679, Japanese Unexamined Patent Application Publication No. 2005-332597, Japanese Unexamined Patent Application Publication (Translation of PCT Application) No. 2004-537150, Japanese Unexamined Patent Application Publication No. 2006-73486, Japanese Unexamined Patent Application Publication No. 2007-294334, Japanese Unexamined Patent Application Publication (Translation of PCT Application) No. 2004-527067, and Japanese Unexamined Patent Application Publication No. 2004-327354.

Japanese Unexamined Patent Application Publication No. 2007-95679 discloses a technique for calculating the methanol concentration from a concentration-voltage curve and a variation range of voltage at the time of methanol supply.

Japanese Unexamined Patent Application Publication No. 2005-332597 discloses a concentration adjustment device for a direct methanol fuel cell that quantitatively calculates the methanol concentration in an aqueous methanol solution by utilizing the principle that the amount of heat of dissolution changes depending on the methanol content.

Japanese Unexamined Patent Application Publication (Translation of PCT Application) No. 2004-537150 discloses a method for controlling the methanol concentration in a DMFC without a concentration sensor. In this method, the control process is performed by sampling current-voltage characteristic curve of a fuel cell using small fluctuations of a system variable current and a methanol concentration.

Japanese Unexamined Patent Application Publication No. 2006-73486 discloses a method for adjusting the concentration of diluted fuel based on the relationship between a flow rate of the fuel and an output voltage of an electricity generating portion of the fuel cell. The method involves increasing and decreasing the flow rate of the diluted fuel supplied to the electricity generating portion, and then measuring the output voltage of the electricity generating portion.

Japanese Unexamined Patent Application Publication No. 2007-294334 discloses a technique which involves filling one common cell in a fuel cell stack with fuel, and calculating the concentration of the fuel based on the amount of generated electricity in the common cell.

Japanese Unexamined Patent Application Publication (Translation of PCT Application) No. 2004-527067 discloses a technique for calculating the methanol concentration from the potential at an anode located near the end of a methanol passage. The methanol concentration becomes lowest at the end of the methanol passage. The potential near the anode is highly sensitive to changes in methanol concentration. The technique, using such characteristics, compares the detected potential with a predetermined reference potential or a potential in another position of the anode, and uses a difference between the potentials to adjust the methanol concentration.

Japanese Unexamined Patent Application Publication No. 2004-327354 discloses an operating method of a fuel cell for adjusting the concentration of fuel to the optimum level by checking an output density at an electricity generating portion of a DMFC based on the relationship between the concentration of fuel and the output density.

It is an object of the present invention to provide an operation control method which estimates the methanol concentration, while omitting a methanol concentration sensor. Another object of the present invention is to provide a method that can adjust or correct the optimum methanol concentration based on a required output even if the performance of a fuel cell is reduced over time, suppressing the reduction in performance of the fuel cell.

The above objects will be more specifically described below. The invention will simultaneously solve the following three technical problems. The technical problems will be described focusing on the oxidation and removal of methanol contained in exhaust gas of each of fuel and an oxidant. Formaldehyde and formic acid can be oxidized and removed in the same way. Thus, the invention can be applied to fuel cells using other liquid organic fuels, such as ethanol.

The first problem to be solved by the present invention is to determine whether the concentration of fuel supplied to the fuel cell is optimum or not even when the temperature of the fuel cell or the outside air changes. The first problem will be described below in detail regarding the DMFC using methanol as a typical fuel.

Fuel exhaust gas contains carbon dioxide as a principal component which is generated by the following reaction (see formula 1). The reaction (represented by the formula 1) is the sum of half cell reactions of an oxidation reaction (see formula 2) on an anode and a reduction reaction (see formula 3) on a cathode, and means that 1 mole of $CO_2$ is generated by exchanging six electrons per cell.

$$CH_3OH + 3/2 O_2 \rightarrow CO_2 + 2H_2O \quad \text{(formula 1)}$$

$$CH_3OH + H_2O \rightarrow CO_2 + 6H^+ + 6e^- \quad \text{(formula 2)}$$

$$3/2 O_2 + 6H^+ + 6e^- \rightarrow 3H_2O \quad \text{(formula 3)}$$

Figure 1:
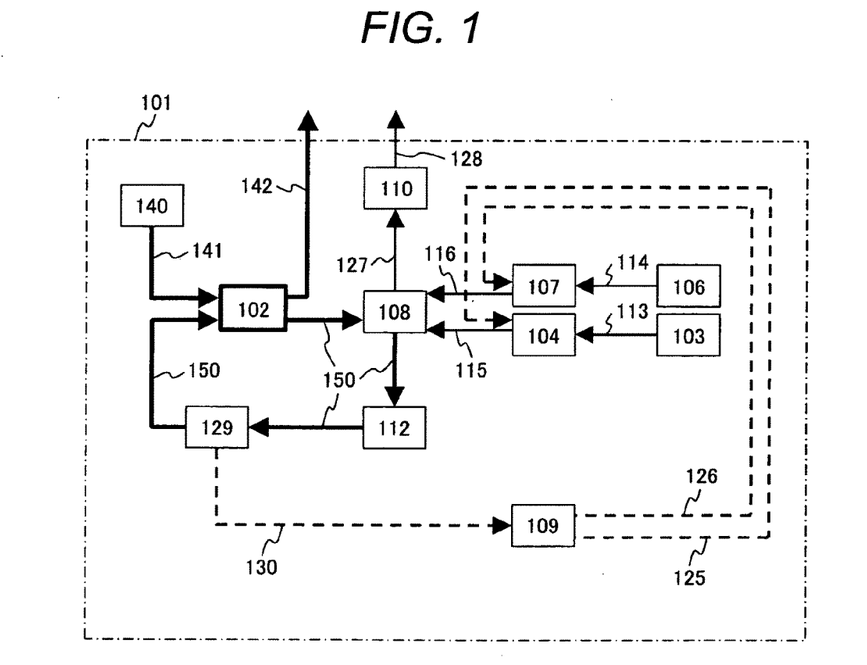
FIG. 1 is a reference diagram showing a configuration of a direct methanol fuel cell system.

FIG. 1 shows a basic configuration of a DMFC system 101. With reference to FIG. 1, the first problem will be described below.

A DMFC body 102 is located substantially at the center of a DMFC system 101. A methanol-containing fuel to be used for electricity generation at the DMFC body 102 is charged into a methanol container 103. Methanol stored in the methanol container 103, which may be 100% purity methanol, is generally an aqueous methanol solution. A necessary amount of methanol is introduced from the methanol container 103 through fuel supply lines 113 and 115 into a fuel mixing tank 108 by fuel supply means 104, such as a bulb or a pump. The methanol can be supplied to a midway of the fuel supply line 115. The fuel supply means 104 is operated when the methanol concentration is equal to or less than a predetermined concentration. These controls are performed by an automatic control mechanism, such as a microcomputer. In the system 101, a controller 109 controls the fuel supply means 104 through a signal cable 125.

When the methanol concentration in the fuel stored in the fuel mixing tank 108 exceeds the upper limit, pure water supply means 107 is operated so that necessary water is supplied from a pure water container 106 through pure water supply lines 114 and 116 to the fuel mixing tank 108 to maintain the methanol concentration in an appropriate range. The pure water can be supplied to the midway of the pure water supply line 116. The controller 109 also controls the pure water supply means 107 through a signal cable 126.

The concentration of the aqueous methanol solution in the fuel mixing tank 108 is adjusted into a predetermined range by the above method. A part of the fuel is sucked up by a fuel circulation pump 112, taken into the fuel circulation line 150, and then supplied to the anode side of the DMFC body 102. At the anode, the methanol is oxidized according to the formula 2. Thereafter, drainage of methanol is returned again to the fuel mixing tank 108 through the fuel circulation line 150.

Methanol concentration measuring means 129 is disposed between the fuel circulation pump 112 and the DMFC body 102, and measures the methanol concentration just before being supplied to the anode of the DMFC body 102. The methanol concentration measuring means 129 can use a sensor for calculating the methanol concentration from measured values, such as a density, a refraction index, and an amount of absorption of infrared light of the fuel. Data on the methanol concentration measured by the methanol concentration measuring means 129 is transferred to the controller 109 through a signal cable 130. The operation of the fuel supply means 104 or the pure water supply means 107 is corrected according to the data on the methanol concentration (feedback control).

Carbon dioxide generated in the oxidation reaction of methanol (formula 2) exists in solution or in the form of minute bubble at the DMFC body 102. The carbon dioxide is moved to the fuel mixing tank 108 through the fuel circulation line 150. In the fuel mixing tank 108, most of the carbon dioxide exists in a vapor phase. When the pressure of the vapor phase is increased, the carbon dioxide is discharged outside the system 101 through exhaust gas lines 127 and 128 and a vapor-liquid separator 110. The vapor-liquid separator 110 may incorporate a catalyst reactor to remove an organic compound, such as methanol contained in a very small amount in the fuel exhaust gas.

Air is supplied to the cathode side of the DMFC body 102 through an air supply line 141 by air supply means 140, such as a fan or a blower. In the cathode, a water-forming reaction proceeds (see formula 3). The exhaust gas after generation of electricity passes through an air discharge line 142 and then is emitted outside the system 101.

The methanol concentration contained in the fuel to be supplied to the anode side of the DMFC body 102 is measured by the methanol concentration measuring means 129. The measured physical amount is normally affected by temperature. For example, the density of the fuel is influenced by thermal expansion of the fuel. Further, the sensitivity of measurement of a measuring device itself in the methanol concentration measuring means 129 is dependent on the temperature.

The fuel temperature is dominated by the temperature of fuel emitted from the DMFC body 102. The temperature of the fuel from the DMFC body 102 is affected by a current value (or output), a change in outside air temperature, or a change in cell resistance over time. In particular, the temperature of the DMFC body 102 transiently varies before and after the change of the output. Therefore, the measurement of the methanol concentration tends to become inaccurate before the temperature becomes stable.

Thus, when an actual temperature of the fuel emitted from the DMFC body 102 varies, the fuel temperature needs to be corrected in response to the variation. The correction over time of the fuel temperature is also a critical technical problem so as to stably manage the concentration.

The second problem to be solved by the present invention is to enable a setting of the optimum fuel concentration in response to a change in required output.

It is known that, in the DMFC, methanol existing in the anode (fuel electrode) penetrates the electrolyte membrane and moves to the cathode (oxidant electrode), and a direct oxidation reaction occurs between oxygen and the methanol on the cathode. This is the so-called methanol crossover. The occurrence of the crossover drastically reduces the potential of the cathode, leading to problematic reduction of the whole cell in voltage between terminals and in output.

As the methanol concentration is decreased, the level of methanol crossover amount can be relatively reduced but the output is also reduced due to the shortage of the fuel under a condition for requiring the high output. When the methanol concentration is high, the output reduction due to the methanol crossover becomes large with respect to the output under a low output condition. That is, the system 101 has a low efficiency of fuel utilization.

For this reason, the operation method which can control the optimum methanol concentration based on the output is more desirable. This is the second problem to be solved by the present invention.

The third problem to be solved by the present invention is to provide an operation method which can autonomously adjust the optimum methanol concentration even when catalytic activity is degraded. This problem arises when the duration of use of the system becomes long and the cell performance is degraded over time.

A membrane electrode assembly (hereinafter referred to as a "MEA"), a gas diffusion layer, and a separator used in the DMFC body 102 have their performance or nature changed gradually by driving over the long time. For example, the activity of the electrode catalyst of the MEA tends to be decreased due to gradual elution or aggregation of catalyst particles over the operating time. The gas diffusion layer may exhibit the flooding phenomenon in which the electrode layer excessively gets wet and shows lower activity due to a reduction of water repellency and drainage capacity. When the superficial nature of the separator is changed, the plugging phenomenon may occur in which formed water remains in the passage and interrupts the flow of air. A cell voltage may be decreased due to an increase in contact resistance between the separator and the gas diffusion layer. These complicated mechanisms gradually reduce a cell output.

Therefore, an adjustment of the fuel concentration is a very effective fuel control technology, which cannot decrease the output as much as possible or can extend the life of the cell as long as possible when the cell performance is degraded. Accordingly, the third problem of the present invention is to provide an operation method which can autonomously adjust the optimum methanol concentration even when the catalytic activity is reduced.

SUMMARY OF THE INVENTION

The inventors have been dedicated to studying to solve the above three problems and, as a result, have achieved a fuel cell using organic fuel of the present invention. The present invention involves a fuel cell that uses a liquid organic compound for fuel and includes a membrane-electrode assembly including an electrolyte membrane which ions pass through, an anode being bonded to one surface of the electrolyte membrane, and a cathode being bonded to another surface of the electrolyte membrane, and a passage for allowing fuel or oxidant to flow.

According to a first aspect of the present invention, the fuel cell further includes a fuel supply unit for supplying the fuel to the fuel cell and intermittently or periodically changing a rate of fuel supply, and a computation processor for measuring a signal of a voltage or an output of the fuel cell, computing the rate of the fuel supply and the signal, and correcting the rate of the fuel supply.

According to a second aspect of the present invention, in the fuel cell of the first aspect, the fuel is methanol; the rate of the fuel supply from the fuel supply unit is varied in a range between two values M1 and M2, and the values M1, M2; and a current I flowing through the fuel cell satisfy the relationship represented by formula 4:

$$M1 < I \times n/6F \leq M2 \quad \text{(formula 4)}$$

where n is the number of single cells in the fuel cell, F is the Faraday constant (96485 C/mol), and M1 and M2 are numbers of moles of methanol supplied per unit time.

According to a third aspect of the present invention, the value M2 is set to satisfy formula 5 based on the current I flowing through the fuel cell:

$$M2 = I \times n/6F + C1 \quad \text{(formula 5)}$$

where C1 is a rate of loss of the methanol discharged from the fuel cell without being electrochemically oxidized, the rate being represented by number of moles per unit time.

According to a fourth aspect of the present invention, the computation processor increases the value M2 and supplies the fuel at a new set value of M2 when the rate of the fuel supply is M2 and an average cell voltage or output of the fuel cell is smaller than a prescribed value.

According to a fifth aspect of the present invention, the computation processor decreases the value M2 and supplies the fuel at a new set value of M2 when the rate of the fuel supply is M2 and an average cell voltage or output of the fuel cell is larger than a prescribed value.

A fuel cell using organic fuel of the present invention can operate with high efficiency.

DETAILED DESCRIPTION OF THE PREFERRED EMBODIMENTS

Figure 2:
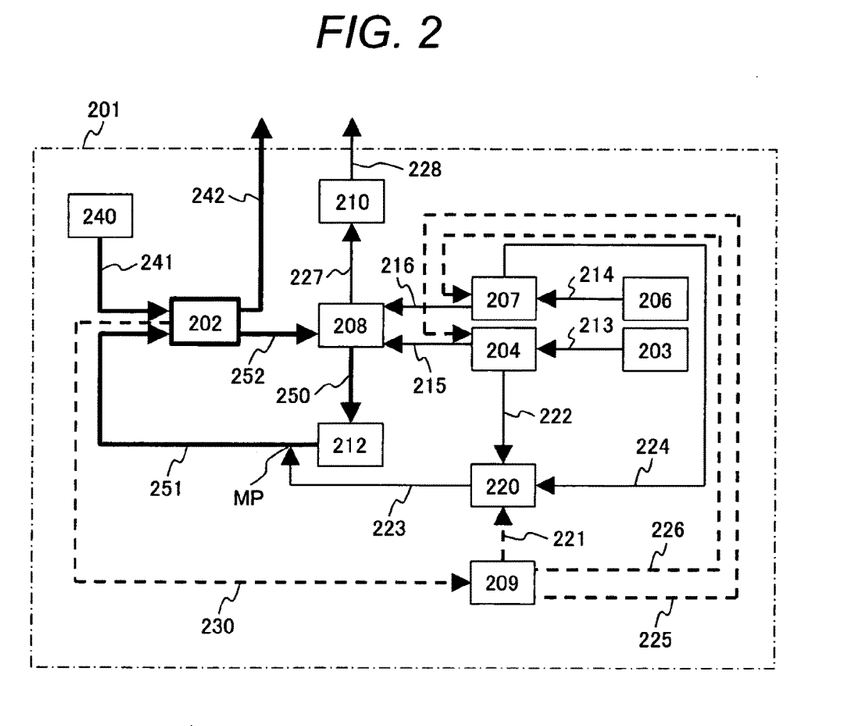
FIG. 2 is a diagram showing a configuration of a fuel cell system according to the invention.

FIG. 2 shows a basic configuration of a DMFC system 201 in the invention. A DMFC body 202 is located substantially at the center of the DMFC system 201. A methanol-containing fuel to be used for electricity generation at the DMFC body 202 is charged into a methanol container 203. Methanol stored in the methanol container 203, which may be 100% purity methanol, is generally an aqueous methanol solution. A necessary amount of methanol is introduced through fuel supply lines 213 and 215 into a fuel mixing tank 208 by fuel supply means 204, such as a bulb or a pump. The methanol can be supplied to a midway of the fuel supply line 215.

The fuel supply means 204 used in supplying the methanol toward the fuel supply line 215 is actuated when the methanol concentration in the fuel passing through a fuel circulation line 250 is equal to or less than a predetermined concentration. When the methanol concentration exceeds the predetermined value, pure water supply means 207 is operated to supply pure water to the fuel mixing tank 208 through pure water supply lines 214 and 216. The composition of the fuel existing in the fuel circulation line 250 is substantially same as that in the fuel tank 208 because methanol is not evaporated or consumed at the midway of the passage. The methanol concentration passing through the fuel circulation line 250 is defined as a "base concentration."

Next, a method for changing the base concentration by a concentration controller 220 will be described below.

The fuel supply means 204 can also supply methanol toward a fuel supply line 222. The pure water supply means 207 can also supply pure water toward a pure water supply line 224.

The concentration controller 220 can operate one or both of the fuel supply means 204 and the pure water supply means 207. The concentration controller 220 performs a predetermined operation by a controller (a computation processor) 209 through a signal cable 221.

For example, when the concentration controller 220 intends to increase the base concentration, the fuel supply means 204 is operated by the controller 209 through a signal cable 225. Fuel is fed to the concentration controller 220 through the fuel supply line 222. The controller 209 controls the fuel supply means 204 so that the concentration controller 220 can intermittently or periodically take in the fuel.

The fuel taken into the concentration controller 220 is injected into a fuel circulation line 251 and mixed with an aqueous methanol solution of the base concentration at a mixing point MP. Only at the time of the injection, the methanol concentration becomes higher than the base concentration. The timing of the injection may be repeated in a constant cycle regardless of output or in a variable cycle corresponding to the output. Alternatively, the timing of injection may be arbitrary according to characteristics data of the fuel cell by setting a threshold for a voltage or temperature of the fuel cell.

When the methanol concentration in the fuel container (the methanol container) 203 is excessively high from the viewpoint of control, the controller 209 operates the pure water supply means 207 through a signal cable 226 so that pure water can be taken into the concentration controller 220 through the pure water supply line 224. Thus, the methanol concentration in the fuel circulation line 251 upon injection from a liquid injection line 223 can be prevented from becoming excessively high. If the methanol concentration is excessively high, the DMFC body 202 cannot consume all methanol in it, and the methanol concentration in the fuel mixing tank 208 will be gradually and disadvantageously increased by the fuel returning from a fuel circulation line 252.

Once the methanol concentration in the fuel circulation line 250 exceeds the upper limit, the pure water supply means 207 supplies the necessary water from a pure water container 206 to the fuel mixing tank 208. As a result, the methanol concentration is kept in an appropriate range. Alternatively or additionally, the pure water can be supplied to the midway of the fuel circulation line 250. Alternatively or additionally, the pure water is supplied to the fuel circulation line 251 by the concentration controller 220 through the pure water supply line 224 and the liquid injection line 223 to dilute the methanol with the pure water.

The following will describe a method for periodically or intermittently decreasing the methanol concentration in the fuel circulation line 251 with respect to the base concentration. The controller 209 send out a signal for driving the pure water supply means 207 through the signal cable 226. The pure water supply means 207 receives the signal and feeds pure water to the concentration controller 220 through the pure water supply line 224. The concentration controller 220 can decrease the base concentration by supplying the pure water through a liquid injection line 223 to the fuel circulation line 251. The timing of adding the pure water may be repeated in a constant cycle regardless of output or in a variable cycle corresponding to the output. Alternatively, the timing of adding may be arbitrary according to characteristics data of the fuel cell by setting a threshold for a voltage or temperature of the fuel cell.

Instead of the pure water, the aqueous methanol solution in which a methanol concentration is lower than the base concentration may be supplied from the liquid injection line 223 so that the concentration in the fuel circulation line 251 can be varied between the base concentration and the low concentration. In this case, the fuel is taken into the concentration controller 220 from the fuel supply line 222 together with the supply of the pure water as described above, and then mixed with the pure water in the concentration controller 220 to produce the low-concentration aqueous methanol solution, which is supplied to the fuel circulation line 251.

In this way, the base concentration can be changed to any one of the high-concentration side and the low-concentration side.

The control method is as follows in which the controller 209 operates the fuel supply means 204 and the pure water supply means 207. The controller 209 takes in characteristics data of the DMFC body 202 through a signal cable 230. The controller 209 computes the characteristics data to determine control conditions including the operation timing and the supply rate of the fuel supply means 204 and pure water supply means 207.

Taking into consideration the above-mentioned operational mechanism, the changes will be described below in methanol concentration in the fuel circulation lines 250, 251, and 252.

The aqueous methanol solution whose concentration is controlled in a predetermined concentration range is once stored in the fuel mixing tank 208. The methanol concentration at this time is the base concentration. A fuel circulation pump 212 circulates a part of the aqueous methanol solution in the fuel mixing tank 208. The methanol concentration is the base concentration in the fuel circulation line 250. The methanol concentration in the liquid injection line 223 and in the downstream side of the mixing point MP and is varied between the base concentration and either the higher concentration or the lower concentration than the base concentration. Finally, the methanol concentration in the fuel circulation line 252 shows the tendency that a concentration variation pattern in the fuel circulation line 251 is entirely shifted to the lower concentration side by a loss due to oxidation and metal crossover in electricity generation and so on. When the amount of methanol crossover is changed depending on the output, temperature, or operation time, the shift range of the pattern may be simultaneously changed.

Usages and functions of other devices, which are not described above, in the DMFC system 201 are same as those of the corresponding devices in the system shown in FIG. 1. The usages and functions of such devices will be briefly described below.

When methanol is oxidized in the DMFC body 202, carbon dioxide is generated according to the formula 2. The carbon dioxide gas exists in solution or in the form of minute bubble in a passage of an anode side separator of the DMFC body 202, in pores of the gas diffusion layer of the anode, or in the fuel liquid. The carbon dioxide is moved to the fuel mixing tank 208 through the fuel circulation line 252. In the fuel mixing tank 208, most of the carbon dioxide exists in a vapor phase. When the pressure of the vapor phase is increased, the gas is discharged outside the system 201 through exhaust gas lines 227 and 228 and a vapor-liquid separator 210. The vapor-liquid separator 210 may incorporate a catalyst reactor to remove an organic compound, such as methanol contained in a very small amount in the fuel exhaust gas.

Air is supplied to the cathode side of the DMFC body 202 through an air supply line 241 by air supply means 240, such as a fan or a blower. In the cathode, the water-forming reaction proceeds (see formula 3). The exhaust gas after generation of electricity passes through an air emission line 242 and then is emitted outside the system 201.

The amount of the fuel stored in the fuel mixing tank 208 should be kept to an appropriate level so as not to be insufficient or excessive. For this reason, a liquid level in the fuel mixing tank 208 is measured. The total amount of the fuel stored in the fuel mixing tank 208 can be controlled by the amount of fuel supplied from the fuel supply line 215 or the amount of pure water supplied from the pure water supply line 216 such that the liquid level does not reach the upper limit or lower limit. The liquid level of the fuel can be measured with a known liquid gauge, such as a float gauge, a hydraulic gauge, a radio gauge, a quartz crystal oscillator gauge, or an ultrasonic gauge, or another known sensor.

The methanol concentration flowing through the fuel circulation line 250 is controlled by a concentration controller 220 capable of intermittently or periodically changing the amount of fuel supply, as well as by the controller 209 which controls the concentration controller 220 and computes the voltage or output of the DMFC body 202. The fuel supply means 204 is controlled by the controller 209 through the signal line 225. The pure water supply means 207 is controlled by the controller 209 through the signal line 226. The voltage or output of the DMFC body 202 is taken in the controller 209 through the signal line 230. The operation signals corresponding to the voltage or output are analyzed and processed by the controller 209. Further, signals to specify conditions including the rate and time of fuel supply are sent to the concentration controller 220 through the signal line 221.

If necessary, pure water can be taken in the concentration controller 220 from the pure water supply means 207 and then supplied to the fuel circulation pump 212. Thus, the concentration of fuel contained in the fuel circulation line 251 can be reduced. In particular, this operation is effective when switching to an operation mode for decreasing the output.

The reason is as follows. If the methanol concentration does not change even when the output is changed, the amount of methanol crossover tends to be substantially constant. As a result, unless the methanol concentration is decreased in a low output state, the rate of loss of the methanol is relatively increased, reducing the fuel utilization.

Now, signals obtained in the DMFC system 201 shown in FIG. 2 will be described below. The following will describe an example in which the concentration of the methanol supplied from the liquid injection line 223 is lower than the base concentration. The methanol concentration pattern is shown on the upper side of FIG. 4. This is an example where only the methanol concentration is oscillated in a stationary state in which the output of the fuel cell and the temperature of the DMFC body 202 are set constant.

Figure 3:
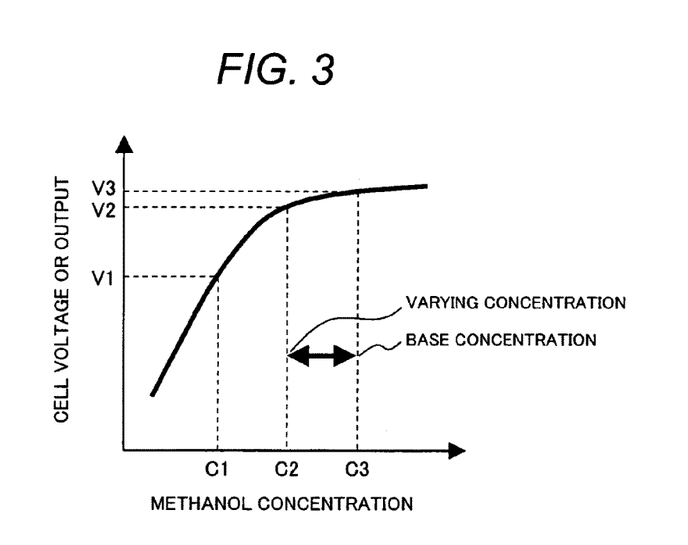
FIG. 3 shows a changing situation of a cell voltage (output) when a methanol concentration is within a range of stable electricity generation.

When the methanol concentration is the base concentration, a methanol oxidation reaction proceeds smoothly at the anode of the DMFC body 202, resulting in high cell voltage. In this state, as shown in FIG. 3, the methanol concentration is C3, C2, or between C3 and C2, and the cell voltage is V3, V2, or between V3 and V2, correspondingly.

Figure 4:
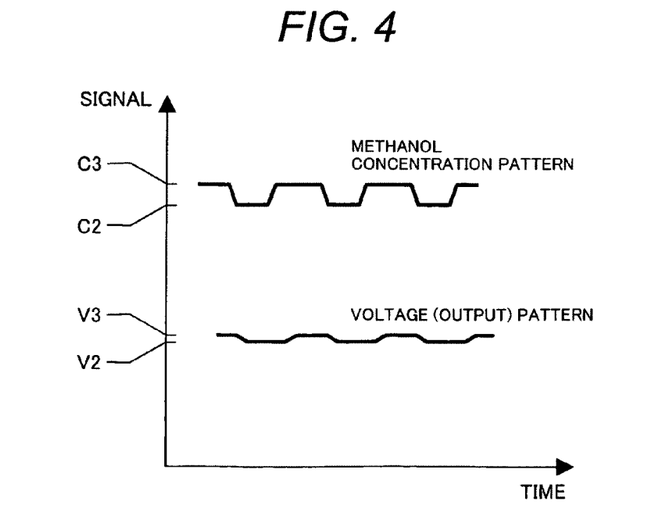
FIG. 4 shows patterns of the cell voltage (output) and the methanol concentration when the methanol concentration is within the range of stable electricity generation.

When the base concentration is substantially constant in a range from the concentration C2 to the concentration C3, the varying concentration does not reach the lower limit concentration C1, and the voltage pattern does not vary largely, only small voltage oscillations being observed as a voltage pattern illustrated on the lower side of FIG. 4. The controller 209 may monitor or record an output pattern instead of the voltage.

Figure 5:
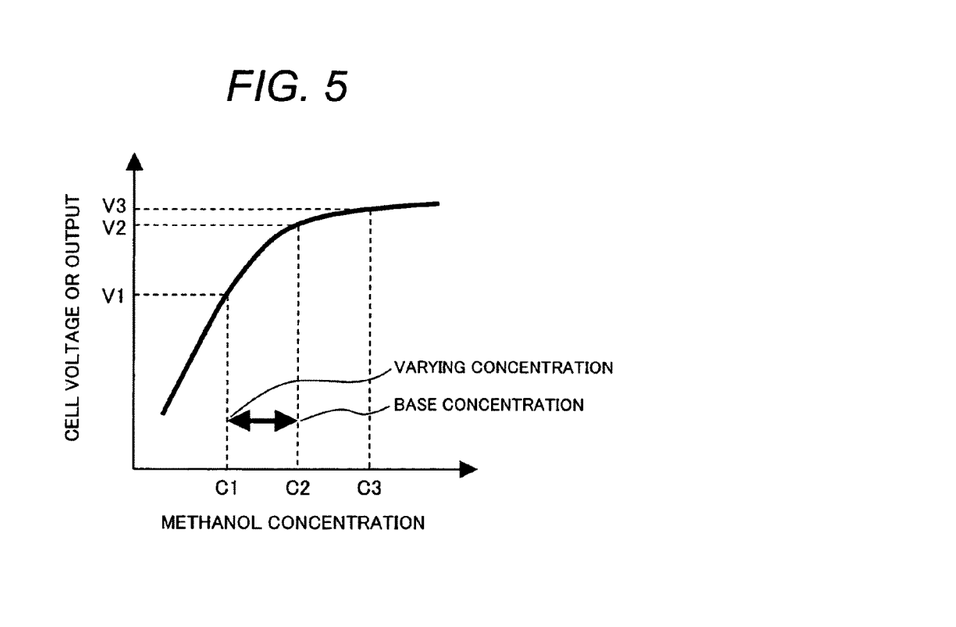
FIG. 5 shows a changing situation of the cell voltage (output) when the methanol concentration is out of the range of stable electricity generation.
Figure 6:
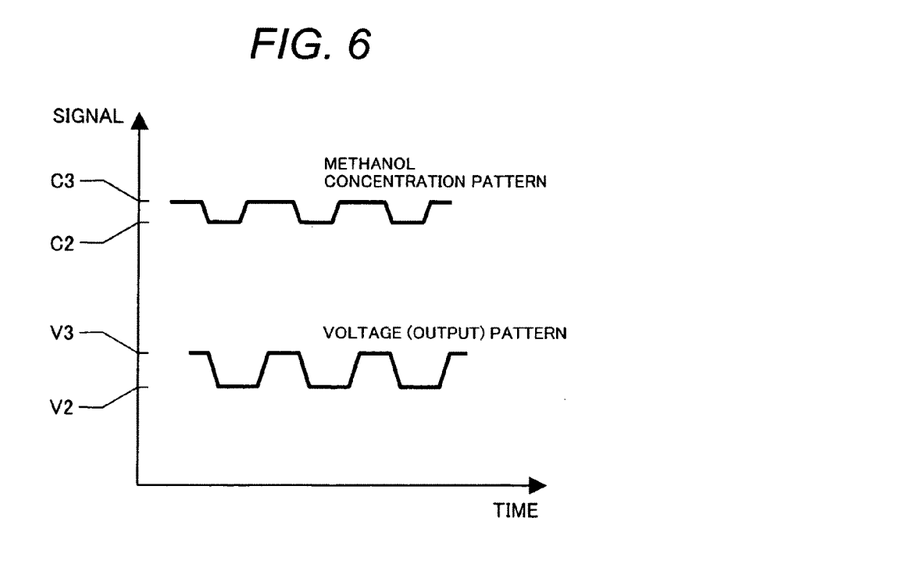
FIG. 6 shows patterns of the cell voltage (output) and the methanol concentration when the methanol concentration is out of the range of stable electricity generation.

When the amount of methanol supplied by the liquid injection line 223 is smaller than the sum of the methanol amount consumed in generation of electricity and the amount of loss of methanol due to the methanol crossover or the like, the base concentration starts to gradually decline. As a result, as shown in FIG. 5, the base concentration is decreased so that the varying concentration reaches the concentration C1, which results in a large decrease in cell voltage in the varying concentration. This situation is represented in FIG. 6 with the methanol concentration pattern and the voltage pattern. The methanol concentration pattern is entirely shifted downward as compared to the concentration pattern shown in FIG. 4, though the concentration variation range is not changed. Together with this shift, the voltage variation range is increased.

The controller 209 takes in data on voltage or output of the DMFC body 202 through the signal cable 230 to measure and analyze the pattern shown in FIG. 4 or FIG. 6. Specifically, it can be confirmed that the base concentration is in a stable operation range (for example, in a range from C2 to C3 in FIG. 4) based on a difference between the voltage (or output) at the base concentration and the voltage (or output) at the varying concentration. When the above voltage difference is increased to exceed the range between the voltages V1 and V2, the base concentration can be determined to be outside the stable operation range, and the base concentration is changed. In order to change the base concentration, the fuel is added from the fuel supply line 215. Alternatively, a setting parameter of the controller 209 may be corrected such that the rate of the fuel supply through the fuel supply line 222 is increased, or that the rate of the pure water supply through the pure water supply line 224 is decreased.

When the voltage difference is much smaller than a prescribed value, the base concentration is found to be higher than the concentration C3. In this case, pure water is added through the pure water supply line 216. Alternatively, a setting parameter of the controller 209 may be corrected such that the rate of the pure water supply through the pure water supply line 224 is increased, or that the rate of the fuel supply through the fuel supply line 222 is decreased.

For example, when the amount of supply and the time interval of the pure water supplied through the pure water supply line 216 and the amount of supply and the time interval of the fuel supplied through the fuel supply line 215 match the preset conditions (program) according to the output of the DMFC body 202, the above-mentioned correction is relatively easy to perform. In such a case, since the base concentration is kept at an almost constant level by the pure water and fuel directly supplied into the fuel mixing tank 208, the correction is sufficient for the amounts and timings of supply of the pure water and fuel to the controller 220. The fuel whose amount is adjusted is sent to the fuel circulation line 251 through the fuel supply line 222 and the liquid injection line 223. The pure water whose amount is adjusted is sent to the fuel circulation line 251 through the pure water supply line 224 and the liquid injection line 223.

The base concentration or the varying concentration is identical to the concentration C2 in the description with reference to FIGS. 3 and 5, but the present invention is not limited to such a case. That is, the shape of the curve in each of FIG. 3 and FIG. 5 is possibly changed according to the current-voltage characteristic curve, the methanol crossover amount, and so on depending on the type of the MEA. Thus, the base concentration or the varying concentration is not necessarily identical to the concentration C2. When the concentrations C3 and C2 are at least set as the upper and lower limits of the stable operation range, the present invention can be carried out. It is more preferable, from the viewpoint of correcting the control parameters of the controller 209, that the concentration C1 is set as a reference value for starting adjustment of a concentration.

The optimum operating conditions are as follows. The base concentration in the fuel mixing tank 208 takes a value on a stable condition (C3 in FIG. 3). The methanol concentration in the fuel mixing tank 208 is substantially same as concentration of fuel emitted from the fuel mixing tank 208. When the base concentration decreases, the fuel concentration gradually approaches C2 or C3 in the DMFC body 202, and, as a result, reaches a lower limit of an alarm voltage.

The controller 209 takes the data on temperatures of the DMFC body 202 through the signal cable 230 and determines the fuel supply conditions using the methanol concentration-cell voltage curve shown in FIG. 3 according to the respective temperatures.

When the output of the system is gradually reduced during the long time operation, the control parameter is corrected by time. Alternatively, the control parameter may be corrected by taking a signal indicating impedance with a specific frequency or DC resistance from the DMFC body 202 through the signal cable 230.

Further, when the output is changed, the control parameters, including a methanol concentration, a cell voltage, or an output shown in FIG. 3, may be corrected to select the optimum operational concentration range according to the output.

In addition to the typical embodiments of the invention described above, the following variations can be made. In the above-mentioned control method, the base concentration is set to the high concentration. Another method involves a reversed concentration-oscillating pattern in FIG. 3, making the base concentration low and the varying concentration high. In this case, low-concentration methanol or water is supplied through the liquid injection line 223.

As mentioned above, the control is desirably performed using three parameters (three-valued system), but can be performed using only two control concentrations in principle. The control using two control concentrations is possible when a differential value (change rate) of the voltage with respect to the methanol concentration is large enough to be measured by the controller 209 in the methanol concentration-voltage curve shown in FIG. 3.

The most balanced condition is achieved when the base concentration in the fuel mixing tank 208 is stable and unchangeable around C3, that is, when the concentration at the outlet of the fuel cell is identical to the base concentration. Thus, the amount of methanol supplied by the concentration controller 220 is substantially identical to the sum of the amount of consumption in electricity generation, the amount of consumed methanol due to the methanol crossover, and the amount of evaporation.

Such a computation control program is stored in a storage and computation unit of the controller 209, which carries out the fuel control method for the fuel cell of the invention.

When studying the control conditions of fuel in more detail, the following will be found. The rate of supply of the fuel from the concentration controller 220 (hereinafter referred to as the fuel supply unit) is varied between two values (M1, M2). The values M1 and M2 are set to satisfy the relationship represented by formula 4 with respect to a current (I) flowing through the fuel cell:

$$M1 < I \times n/6F \leq M2 \quad \text{(formula 4)}$$

where n represents the number of single cells in the fuel cell, F is the Faraday constant (96485 C/mol), and M1 and M2 represent the number of moles of methanol supplied per unit time.

In another variation of the control, the rate M2 of the fuel supply is set to satisfy the following formula 5 based on the current (I) flowing through the fuel cell:

$$M2 = I \times n/6F + C1 \quad \text{(formula 5)}$$

where C1 is the rate of loss (the number of moles per unit time) of the methanol discharged from the fuel cell without electrochemical oxidation.

In a further variation of the control, when the rate of the fuel supply is M2 and an average cell voltage or output of the fuel cell is smaller than a prescribed value, the computation processor (the controller 209) is operated to increase the rate M2 and supply the fuel at a new set value of the M2.

When the rate of the fuel supply is M2 and the average cell voltage or output of the fuel cell is larger than a prescribed value, the computation processor may be operated to decrease the rate M2 and supply the fuel at a new set value of the M2. The computation processor is equivalent to the controller 209 shown in FIG. 2.

In order to allow users to easily identify a series of the control status and improve the usability, the computation processor quantifies a state of the fuel cell from the M1 and shows the quantified state by a graphical symbol or a numerical value on a display of the fuel cell.

Figure 7:
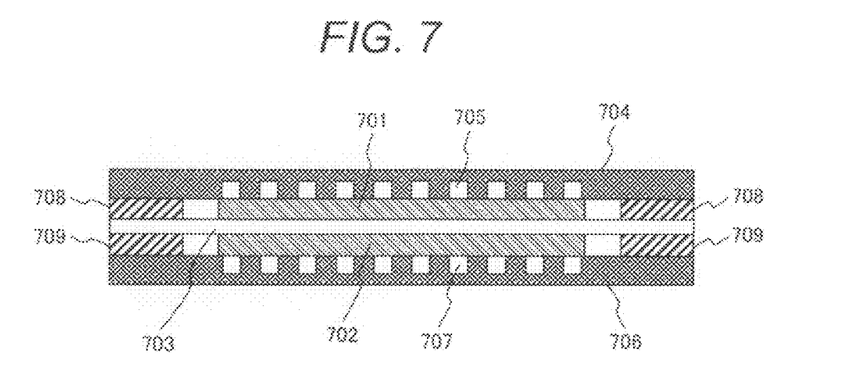
FIG. 7 is a cross-sectional view of a single cell in the invention.
Figure 8:
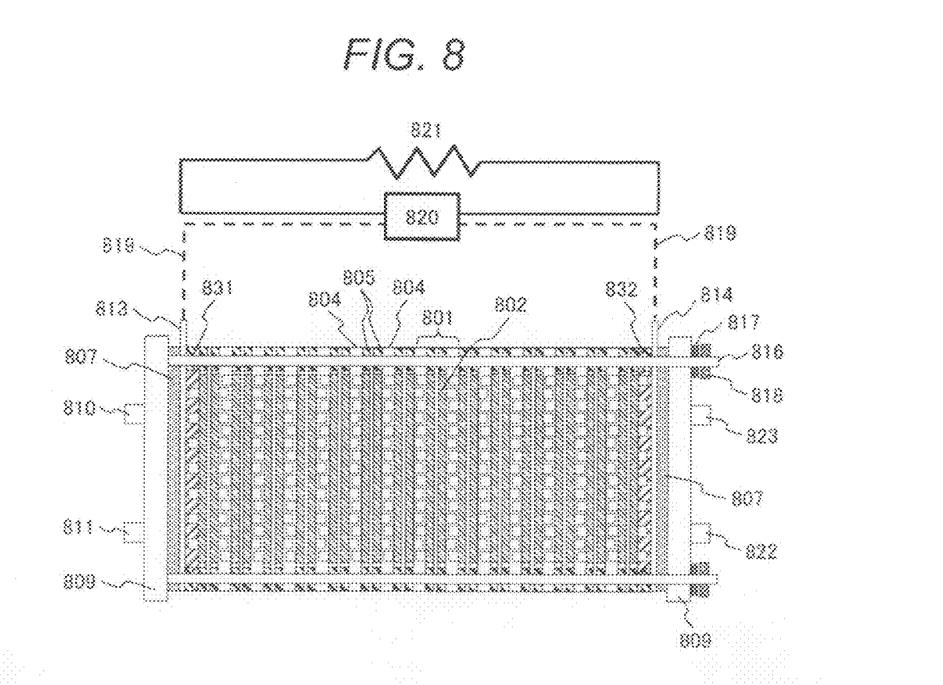
FIG. 8 is a cross-sectional view of a fuel cell body in the invention.

The following will describe an example in which the fuel control method for the fuel cell of the invention is applied to the system shown in FIG. 2. FIG. 7 shows an example of a cross-sectional structure of a single cell included in the DMFC body 202 of the invention. FIG. 8 shows an example of a cross-sectional structure of the DMFC body 202 of the invention.

The structure of the single cell will be described below. In the single cell, a MEA of three-layered structure including an anode 701, a solid polymer electrolyte membrane 703, and a cathode 702 is sandwiched between a separator 704 with an anode passage 705 and a separator 706 with a cathode passage 707.

The separator 706 has the oxidant passage (cathode passage) 707. The oxidant passage 707 is located at the surface of the separator 706 and in contact with the cathode 702.

The cathode 702 includes a catalyst layer and a gas diffusion layer. The catalyst layer is fixed to the surface of the electrolyte membrane 703. The catalyst layer is generally made of material including platinum fine particles supported by graphite powder, and may be made of other catalysts. The gas diffusion layer is provided on the catalyst layer.

The fuel passage (anode passage) 705 is formed in the separator 704. The fuel passage 705 is in contact with the anode 701.

The catalyst layer is formed in the following way. The fine particles of platinum are supported by the graphite powder. Alternatively, fine particles of alloy are supported by the graphite powder, the alloy being made of platinum and a promoter such as ruthenium, which oxidizes and removes carbon monoxide generated in the fuel oxidation. Then, the fine particles and the graphite powder are bonded together by an electrolyte binder. Other catalyst may be used. Further, the gas diffusion layer is provided on the catalyst layer.

The anode 701 and the cathode 702 are bonded to respective sides of the electrolyte membrane 703, which is defined as a membrane-electrode assembly (MEA) in this embodiment. A layer having a gas diffusion function, such as the gas diffusion layer, is included in the anode 701 and the cathode 702. The electrolyte membrane 703 serves as a medium for transporting hydrogen ions ($H^+$) generated in the anode 701 to the cathode 702.

The reaction (represented by formulas 2 and 3) in the fuel cell starts when hydrogen ions are generated from a liquid organic fuel, such as methanol, in the anode 701 and electrons are also taken from the anode 701. The electrons move to the separator 704, circulate through an external circuit, and are transferred to the separator 706. Finally, the electrons, the number of which is same as that of the electrons generated in the anode 701, are transported to the cathode 702.

An oxidant (oxygen) is supplied from the oxidant passage 707 to the cathode 702 and reacts with hydrogen ions which have penetrated the electrolyte membrane 701 to generate water.

The fuel and the oxidant are separated by the MEA and the separators in order not to directly react with each other. These reactants are protected by gaskets 708 and 709 not to leak outside.

Specifically, the gasket 708, an electrolyte membrane part of the MEA, and the gasket 709 are laminated and crimped between two separators to prevent the leakage of the fuel and the oxidant. The gasket can be made of an elastic member having resistance to oxidation, reduction, and water, such as ethylene-propylene rubber, fluorine-contained rubber, or silicon rubber. Epoxy resin may be used as an adhesive and cured to be substituted for the gasket.

An oxidant-supply manifold is formed to penetrate apart of the separators 704 and 706 so as to supply the oxidant to each single cell. The oxidant is supplied to each single cell from the manifold, oxidized at the cathode 702, and discharged to the outside of the fuel cell through an oxidant-emission manifold. The gaskets 708 and 709 are respectively inserted between the separator 704 and the electrolyte membrane 701 and between the separator 706 and the electrolyte membrane 701 to prevent the leakage of the oxidant and the fuel.

A passage from the oxidant-supply manifold to the oxidant passage 707 is formed in a plane of the separator 706. This passage is not shown in FIG. 7 because the passage will be superimposed on a part of the gasket 709 on the left side of FIG. 7 if the passage is shown in a plan view of FIG. 7.

A passage from a passage 707 to the oxidant-emission manifold is formed in a plane of the separator 706. This passage is also not shown in FIG. 7 because the passage will be superimposed on a part of the gasket 709 in FIG. 7 if shown in a plan view.

A fuel-supply manifold and a fuel-emission manifold are not shown in FIG. 7 because these fuel manifolds will be superimposed on the oxidant manifolds if shown in the cross-sectional view of the single cell of FIG. 7.

A plurality of such single cells are manufactured to form a cell stack, which is the DMFC body shown in FIG. 8. Each of single cells 801 in FIG. 8 corresponds to the single cell shown in FIG. 7. The single cells 801 are connected in series. Current collectors 813 and 814 are arranged at both ends of the cell stack. The cells and the current collectors are clamped with end plates 809 from the outside via insulation plates 807. When the end plates are made of an insulating material, the insulation plates 807 can be omitted. Clamps for the cells and the current collectors include bolts 816, springs 817, and nuts 818.

Referring to FIG. 8, the fuel is supplied from a fuel-supply connector 810 in the end plate 809 on one side of the DMFC body, oxidized at the anode of each MEA while passing through the respective single cells 801, and then emitted from a fuel-emission connector 822 in the end plate 809 on the other side of the DMFC body. The fuel can be a liquid organic fuel, such as methanol.

Likewise, referring to FIG. 8, the oxidant is supplied from an oxidant-supply connector 811 in the end plate 809 on one side of the DMFC body, and emitted from an oxidant-emission connector 823 in the end plate 809 on the other side of the DMFC body. Air is supplied through a pipe from a fan provided outside the fuel cell.

Such an arrangement of the components is used to manufacture the fuel cell stack composed of 25 single cells 801.

Fuel and air were actually supplied to a 200-W grade DMFC configured as in FIG. 8, and then the battery characteristic and removal efficiency of methanol were examined. The cell stack of this embodiment is defined as "S1."

The concentration of aqueous methanol solution stored in the fuel container (the methanol container) 203 in FIG. 2 was 50%, and the concentration of aqueous methanol solution circulating through the fuel circulation line was 3 to 6%. The base concentration controlled by the controller 209 was 3%, and the varying concentration was 1%. A holding time of the base concentration was 60 seconds, while a holding time of the varying concentration was 10 seconds. A correction start voltage V1 of the control parameters was 350 mV, and stable electricity-generation voltages V2 and V3 were 370 mV and 390 mV, respectively.

The voltage of air supply means (a fan) 240 was set such that the oxidant utilization was 10%.

Then, when electricity is generated at a current of 15 A (current density being 0.2 A/cm$^2$), a rated power output of 100 W was obtained. The temperature of the fuel cell was controlled in a range of 55 to 60° C.

The fuel control method for the fuel cell of the invention enabled the continuous operation of electricity generation for 100 hours.

What is claimed is:

1. A fuel cell using a liquid organic compound for fuel, comprising:

a membrane-electrode assembly including an electrolyte membrane which ions pass through, a fuel electrode being bonded to one surface of the electrolyte membrane, and an oxidant electrode being bonded to another surface of the electrolyte membrane;

a passage configured to allow fuel to flow;

a passage configured to allow oxidant to flow;

a fuel mixing tank configured to store fuel supplied to the fuel cell;

a fuel circulation line configured to circulate the fuel in the fuel mixing tank and supply the fuel to the fuel cell;

a liquid injection line connected to a mixing point located in the fuel circulation line;

a concentration controller configured to intermittently or periodically supply the fuel or water to the mixing point through the liquid injection line; and a controller programmed to measure a signal of a voltage or an output of the fuel cell, wherein the controller is programmed to obtain a difference between the voltage or the output when the fuel supplied to the fuel cell has a same concentration as a concentration of the fuel in the fuel mixing tank, and the voltage or the output when the fuel supplied to the fuel cell has a changed concentration with the fuel or water intermittently or periodically supplied from the concentration controller to the fuel circulation line, wherein the controller is programmed to increase a supply rate of the fuel supplied from the concentration controller through the liquid injection line or decrease a supply rate of the water supplied from the concentration controller through the liquid injection line when the difference between the voltage or output exceeds a prescribed range, and wherein the controller is programmed to decrease a supply rate of the fuel supplied from the concentration controller through the liquid injection line or increase a supply rate of the water supplied from the concentration controller through the liquid injection line when the difference between the voltage or output is smaller than a prescribed value.

2. The fuel cell according to claim 1,
wherein the fuel is methanol; and
the supply rate of the fuel supplied from the concentration controller is varied in a range between two values M1 and M2, and the values M1, M2, and a current I flowing through the fuel cell satisfy the relationship represented by formula A:

$$M1 < I \times n/6F \leq M2 \quad \text{(formula A)}$$

where n is the number of single cells in the fuel cell, F is the Faraday constant (96485 C/mol), and M1 and M2 are numbers of moles of the methanol supplied per unit time.

3. The fuel cell according to claim 2,
wherein the value M2 is set to satisfy formula B based on the current I flowing through the fuel cell:

$$M2 = I \times n/6F + C1 \quad \text{(formula B)}$$

where C1 is a rate of loss of the methanol discharged from the fuel cell without being electrochemically oxidized, the rate being represented by number of moles per unit time.

4. The fuel cell according to claim 2,
wherein the controller is programmed to increase the value M2 and supply the fuel at a new set value of M2 when the supply rate of the fuel supplied is M2 and an average cell voltage or output of the fuel cell is smaller than a prescribed value.

5. The fuel cell according to claim 2,
wherein the controller is programmed to decrease the value M2 and supply the fuel at a new set value of M2 when the supply rate of the fuel supplied is M2 and an average cell voltage or output of the fuel cell is larger than a prescribed value.

6. The fuel cell according to claim 1, wherein the supply rate of the fuel is a molar supply rate.

7. The fuel cell according to claim 2, wherein M1 denotes the lower limit in numbers of moles of the methanol supplied per unit time to the fuel cell, and M2 denotes the upper limit in numbers of moles of the methanol supplied per unit time to the fuel cell.

8. The fuel cell according to claim 1, wherein the mixing point is located at a position in the fuel circulation line between the fuel mixing tank and the fuel cell.

* * * * *